US010761976B2

(12) United States Patent
Bhargava et al.

(10) Patent No.: US 10,761,976 B2
(45) Date of Patent: Sep. 1, 2020

(54) METHOD AND APPARATUS FOR MEMORY WEAR LEVELING

(71) Applicant: ARM Limited, Cambridge (GB)

(72) Inventors: Mudit Bhargava, Austin, TX (US);
Joel Thornton Irby, Austin, TX (US);
Vikas Chandra, Fremont, CA (US)

(73) Assignee: ARM Limited, Cambridge (GB)

( * ) Notice: Subject to any disclaimer, the term of this patent is extended or adjusted under 35 U.S.C. 154(b) by 352 days.

(21) Appl. No.: 15/361,804

(22) Filed: Nov. 28, 2016

(65) Prior Publication Data
US 2018/0150389 A1    May 31, 2018

(51) Int. Cl.
*H04L 9/08* (2006.01)
*G06F 12/02* (2006.01)
*G11C 13/00* (2006.01)

(52) U.S. Cl.
CPC ...... *G06F 12/0238* (2013.01); *G11C 13/0002* (2013.01); *G11C 13/0023* (2013.01); *G11C 13/0035* (2013.01); *G11C 13/0059* (2013.01); *H04L 9/0891* (2013.01); *H04L 9/0894* (2013.01); *G06F 2212/1024* (2013.01); *G06F 2212/1036* (2013.01); *G06F 2212/1056* (2013.01); *G06F 2212/7201* (2013.01); *G06F 2212/7211* (2013.01)

(58) Field of Classification Search
CPC ......... G06F 12/0253; G06F 2212/7211; G06F 2212/7201; H04L 9/0894; H04L 9/0891; G11C 13/0059; G11C 13/0035; G11C 13/0002; G11C 13/0023
See application file for complete search history.

(56) References Cited

U.S. PATENT DOCUMENTS

| | | | | |
|---|---|---|---|---|
| 8,316,201 B2 * | 11/2012 | Stern | ................... | G06F 11/1008 711/165 |
| 8,793,429 B1 * | 7/2014 | Call | .................... | G06F 12/0246 711/103 |
| 9,772,781 B2 * | 9/2017 | Salessi | ................ | G06F 12/1009 |
| 2009/0279362 A1 * | 11/2009 | Stern | ................... | G11C 11/5628 365/185.18 |
| 2011/0219259 A1 * | 9/2011 | Frost | ................... | G06F 11/1469 714/6.2 |
| 2013/0275656 A1 * | 10/2013 | Talagala | .............. | G06F 12/0246 711/103 |
| 2014/0136753 A1 * | 5/2014 | Tomlin | ................ | G06F 12/0246 711/103 |
| 2015/0089183 A1 * | 3/2015 | Bains | ...................... | G06F 12/06 711/202 |
| 2017/0045905 A1 | 2/2017 | Sandhu et al. | | |
| 2017/0047919 A1 * | 2/2017 | Sandhu | ................. | H01L 49/003 |

* cited by examiner

*Primary Examiner* — Khoi V Le
(74) *Attorney, Agent, or Firm* — Leveque IP Law, P.C.

(57) ABSTRACT

A method and apparatus is provided for wear leveling of a storage medium in an electronic device. Wear leveling is achieved by mapping each logical memory address to a corresponding physical memory address. The mapping information is consistent over an on-period of a power cycle, but changes from one power cycle to another. The mapping information, such as a key value for example, may be stored in non-volatile memory such as, for example, a correlated electron random switch (CES) storage element. The mapping may be obtained by manipulating bits of the logical address to obtain the physical address.

24 Claims, 8 Drawing Sheets

METHOD AND APPARATUS FOR MEMORY WEAR LEVELING

TECHNICAL FIELD

The present disclosure relates to wear leveling of memories or other storage media.

BACKGROUND

Memory cells often have a finite erase/write capability. The process of wear leveling is designed to reduce the likelihood of premature failure in memory arrays by preventing any one region of memory being used much more frequently than any other region.

In addition, memory cells, even those considered as volatile, have been shown to have some non-volatile 'remanence' characteristics. Remanence characteristics result in having some residual information from previously stored values even after a power off cycle. By probing memory cells, it is therefore possible to partially recover bits of the secret keys that were stored for a long time but have gone through a power off cycle since. A security breach may occur by sophisticated direct probing of memory cells. If an attacker is aware of the physical location of the key or any other relevant data being sought, the attack becomes easier.

DETAILED DESCRIPTION OF THE EMBODIMENTS

Figure 1:
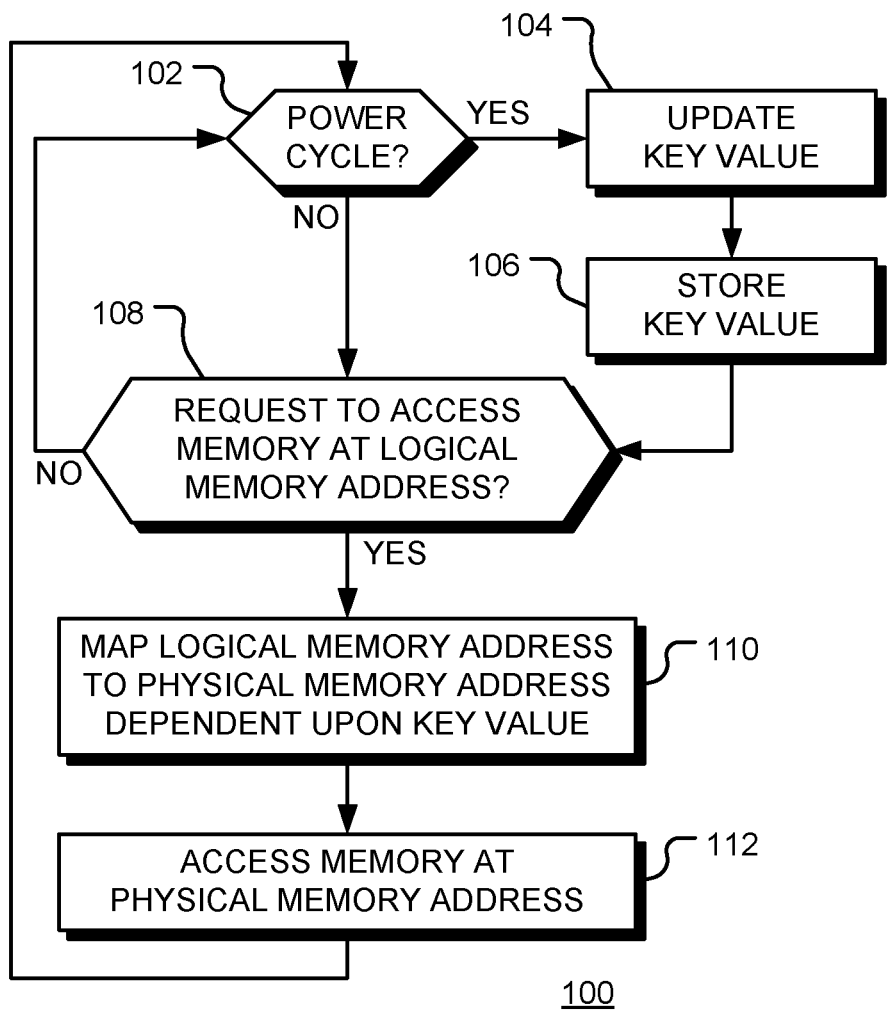
FIG. 1 is a flow chart of a method for wear leveling of a storage medium in accordance with some embodiments of the disclosure.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

As utilized herein, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

Memory cells often have a finite erase/write capability. The process of wear leveling is designed to reduce the likelihood of premature failure in memory arrays by preventing any one region of memory being used much more frequently than any other region. For example, a memory controller may maintain a lookup table to translate each memory logical block address used by a host system to a physical block address in the memory. The controller's wear-leveling algorithm determines which physical block is used. The look-up table may be updated dependent upon which memory block has been least used.

Particular features of the present disclosure relate to an apparatus for wear-leveling of a storage medium. Other features of the present disclosure relate to a method to provide wear leveling of a storage medium by varying a mapping from logical memory addresses to physical memory addresses. The mapping information may be stored locally in a non-volatile memory, such as a correlated electron switch (CES) memory cell.

During operation, an electronic device or apparatus is provided with an electrical power supply. Often, the supply is not continuous and may be turned off. For example, the power supply may be turned off to conserve energy. When a power supply is initially provided, the apparatus may perform a power-on operation. Similar, when the supply is to be turned off, the apparatus may perform a power-off operation. Additionally, power supplied to the apparatus may be reduced to a level lower than that required for normal operation during a 'sleep' operation. A power cycle includes a power-on operation and a power-off or sleep operation, also referred to as an off-period or a sleep-period, respectively. Following a power-on operation, electrical power is supplied to the apparatus and the power supply continues during an on-period of a power cycle. The electrical power supply is discontinued at a power-off operation and does not resume until the next power-on operation. The electrical power supply is reduced below the operational level at a sleep operation and normal operation does not resume until the next power-on operation.

In the following, descriptions referencing a power-off or power-down period or operation also applied to a sleep period or operation.

An electronic apparatus may include a volatile memory. A volatile memory may be used to store data during an on-period of a power cycle. However, any data in a volatile memory is lost following a power-off operation.

Often, code executed on a hardware processor of a device uses a storage medium, such as a volatile memory, in a similar manner in each on-period of the power cycle. For example, memory may be allocated sequentially so that memory at lower addresses is used much more often than memory at higher addresses. As a result, some regions of the volatile memory are used more often than other regions. Some storage elements may wear out and fail after a limited number of erase/write cycles. Thus, if one part of a memory is used more frequently than others, the memory may fail sooner than if all parts were used a similar number of times.

The process of wear leveling attempts to work around this limitation by arranging data so that memory accesses are distributed evenly across the storage medium. In this way, no single part of the medium prematurely fails due to a high concentration of erase/write cycles.

In addition to improved lifetime, wear leveling for volatile memories may be desirable for improved security.

In accordance with various embodiments of the present disclosure, wear leveling is achieved by mapping logical memory addresses to physical memory addresses. The mapping information is consistent over an on-period of a power cycle, but changes from one power cycle to another. The mapping information, such as a key value for example, is stored in non-volatile memory such as, for example, a correlated electron switch (CES) memory cell. For volatile memories, all data is lost following a power-off operation, so no movement of data required when the mapping is changed. The mapping may be, for example, a 1-to-1 bijective mapping (exclusive and one-to-one) from a logical memory address to a physical memory address. The mapping may be obtained by manipulating bits of the logical address to obtain the physical address. This avoids the need to store a large look-up table. For example, some bits of the address may be flipped, or the bit order modified, or a combination thereof.

In accordance with some embodiments of the present disclosure, a method is provided for controlling usage of a volatile memory or other storage medium of an electrically powered device. In the method, a logical memory address is received and mapped to a physical memory address in the volatile memory or other storage medium. The mapping is dependent upon a key value stored in a non-volatile memory. The volatile memory or other storage medium is then accessed at the physical memory address. The key value stored in a non-volatile memory may be updated at each power cycle of the electrically powered device or after a number of power cycles (e.g. every $n^{th}$ power cycle).

FIG. 1 is a flow chart of a method 100 for wear leveling of a volatile memory or other storage medium. If a new power cycle is detected at decision block 102, a key value is updated at block 104 and saved to a non-volatile memory at block 106. The non-volatile memory may be any memory that retains the stored value when the power supply is turned off. Examples include flash memory, CES memory, battery-backed memory, etc. If a request for an access to the volatile memory at a particular logical memory address is received, as depicted by the positive branch from decision block 108, the logical memory address is mapped to a physical memory address at block 110. The mapping is dependent upon the stored key value. At block 112, the volatile memory is accessed at the physical memory address. This process is repeated for subsequent memory access requests, and the key value is updated at each power cycle or after a number of power cycles. The update may be performed at power-up, at power-down, at a sleep operation, or at intervals during the on-period of the power cycle. Since the contents of the volatile memory are lost at power-down, no reorganization of memory is required when the key value is changed. The approach may also be used for non-volatile memory; however, values to be retained between power cycles must be reorganized whenever the mapping is changed.

A variety of approaches may be used to update the key value. For example, in a first approach the physical address in a current power cycle may be shifted to start from the last physical address used in the previous power cycle. This may be useful, for example, if mostly the first few blocks of memory are used. The last address used (the most recently used (MRU) address) is stored in a non-volatile memory such as a CES storage element. The non-volatile memory retains the MRU address from the previous power-up operation. In operation, the MRU address is added to the logical address to obtain the new physical address. The MRU address for current power-up operations can be continuously updated at every address operation, after every N cycles (to save write power) or periodically. In one embodiment, the address adder may operate on a portion of the entire address, such as the most significant bits (MSBs), to reduce complexity and minimize adder delay overhead. Thus, the key value may comprise one or more bits of a physical memory address accessed at the end of an on-period of a power cycle.

In this embodiment, the key value comprises an address offset value and the logical memory address is mapped to the physical memory address by adding the logical address and the address offset values. The key value, stored in the non-volatile memory, is updated at each power cycle of the electrically powered device comprises by storing a most recently accessed physical memory address in the non-volatile memory at the end of an on-period of a power cycle.

Figure 2:
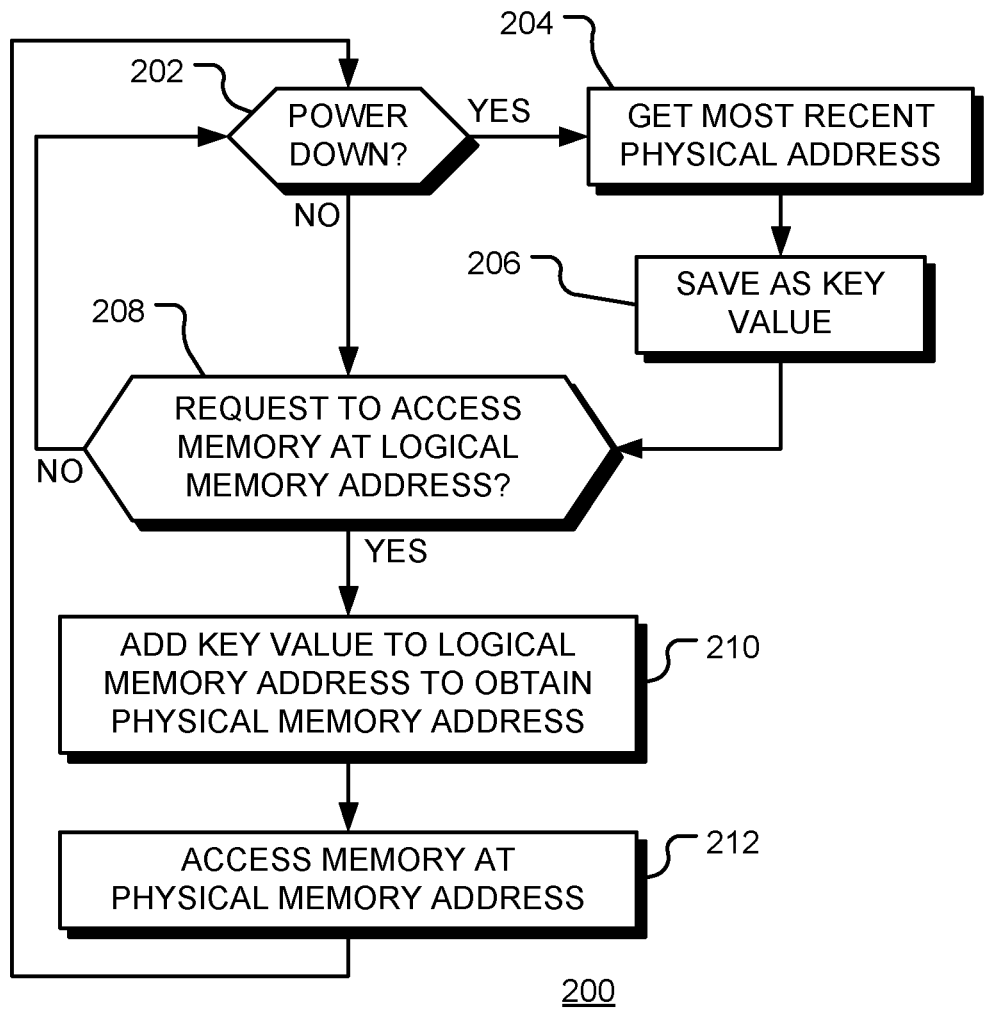
FIG. 2 is a flow chart of a further method for wear leveling of a storage medium in accordance with some embodiments of the disclosure.

FIG. 2 is a flow chart of a method 200 for wear leveling of a volatile memory or other storage medium. In this embodiment, the key value is equal to or derived from the most recently used physical address in the previous power cycle, as described above. When a power-down operation is detected at decision block 202, the key value is updated to be the recently used address, or a value derived from it, at block 204. The key value, or a value derived from it, is saved to a non-volatile memory at block 206. If a request for an access to the volatile memory at a particular logical memory address is received, as depicted by the positive branch from decision block 208, the logical memory address is mapped to a physical memory address at block 210. The mapping is achieved by adding the most recent used address (the stored key value) to the logical address to provide the physical address. The addition operation is performed modulo the size of the address space, to ensure that the resulting physical address is within the address space. At block 212, the volatile memory is accessed at the physical memory address. This process is repeated for subsequent memory access requests, and the key value is updated at each power cycle or after a number of power cycles. The update may be performed at power-down or sleep. The most recently used address may be saved at intervals during the on-period of the power cycle. The most recently saved address, or the most significant bits thereof, may be used directly. Alternatively, an offset may be added to a most recently saved address.

In a second approach, the physical memory address is obtained by scrambling the logical memory address. Scrambling may be performed via a bijective function, for example. In this approach, the key value generates a bus "scrambler". The scrambler may be a bijective function such as a counter, a linear feedback shift register (LFSR), a hash function, a cryptographic primitive, or a physical unclonable function (PUF), etc. The "scrambler" is evaluated one or more times after each power-up (or after a number of power-up operations) and before any memory access starts. The value of the scrambler stays constant while the device is powered-up. Once the scrambler is updated, after one or more cycles, the key value is updated to save the value in the scrambler. In an alternate embodiment, the key value is a function of the scrambler state. The physical address may be created by an XOR (or XNOR) operation between the bits of the logical memory address and the scrambler bits. For additional security, a more complicated function, such as a cryptographic primitive, may be used to make the mapping a function of the key value. The key for such a secure translation can be generated using the stored key value bits.

Figure 3:
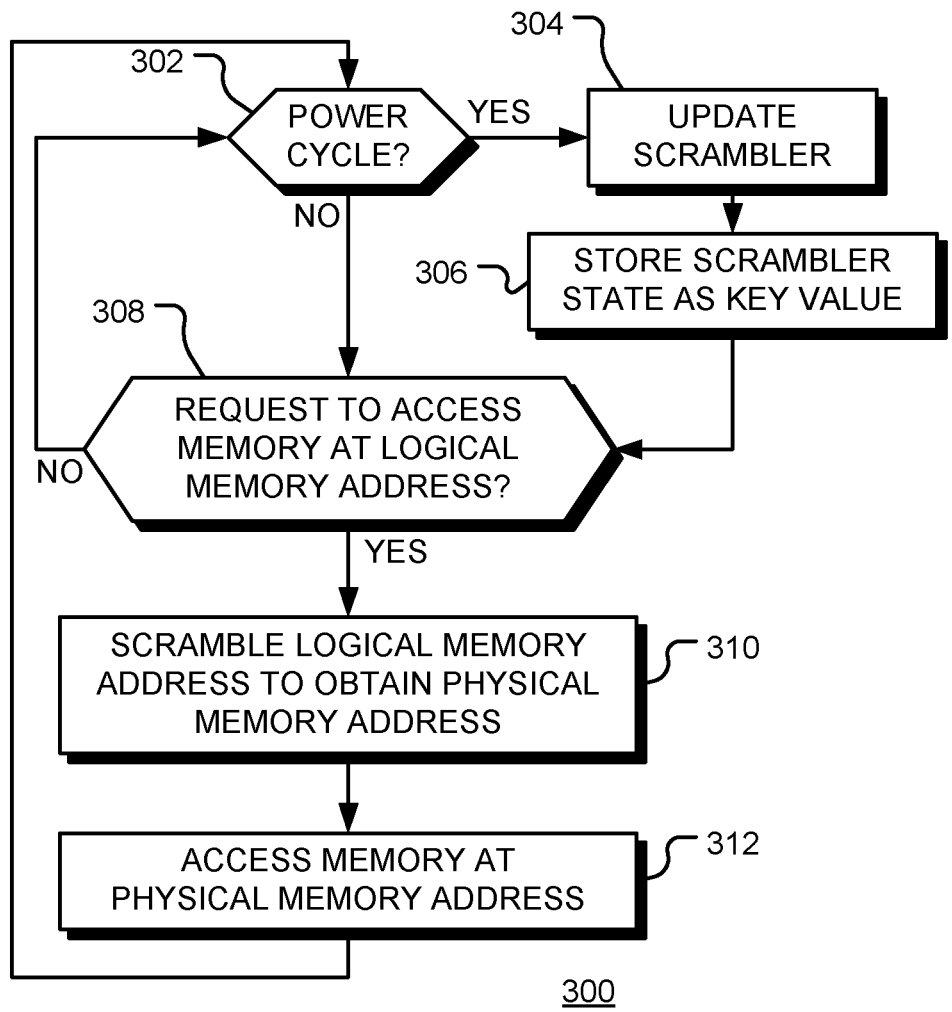
FIG. 3 is a flow chart of a still further method for wear leveling of a storage medium in accordance with some embodiments of the disclosure.

FIG. 3 shows a flow chart of a method 300 for wear leveling of a volatile memory or other storage medium. If a new power cycle is detected at decision block 302, a scrambler is updated at block 304. The key value relates to the state of the scrambler and is saved to a non-volatile memory at block 306. The scrambler may be a pseudo-random number generator, for example. The non-volatile memory may be any storage medium that retains the stored value when the power supply is turned off. Examples include flash memory, CES storage, battery-backed memory, etc. If a request for an access to the volatile memory at a particular logical memory address is received, as depicted by the positive branch from decision block 308, the logical memory address is mapped to a physical memory address at block 310. The mapping may be achieved, for example, by performing a bit-wise XOR operation between the output from the scrambler and the logical address. Thus, the mapping is dependent upon the stored key value. At block 312, the volatile memory is accessed at the physical memory address. This process is repeated for subsequent memory access requests, and the key value is updated at each power cycle or after a number of cycles. The scrambler update may be performed at power-up or at power-down. Since the contents of the volatile memory are lost at power-down, no reorganization of memory is required. This approach may be used for non-volatile memory; however, values to be retained between power cycles must be reorganized whenever the mapping is changed.

In this embodiment, mapping the logical memory address to the physical memory address comprises scrambling the logical memory address in a scrambler and the key value comprises a state of the scrambler. Updating the key value stored in the non-volatile memory at a power cycle comprises generating a next state of the scrambler from a current state.

The address scrambler may be, for example, a counter, a linear-feedback shift register (LFSR), a hash function, a cryptographic primitive, or a physical unclonable function (PUF).

In a third approach, the bits of the logical address are reordered to create the physical address. This mapping of the logical memory address to the physical memory address may be achieved using a multiplexer array, for example. For each multiplexer of the multiplexer array, the logic memory address is input to the multiplexer and the multiplexer is controlled dependent upon the key value to select one bit of the logical memory address. The selected one-bit of the logical memory address is output as one bit of the physical memory address. The multiplexer array may be configured to produce a bijective mapping between the logical memory address and the physical memory address.

The mapping may be a bijective mapping and is a function of key value bits. The key value bits are updated for the next power-up duration, either just before power-down or just after power-up. The mapping may be performed via one or more look-up tables or by manipulating some or all of the bits of the logical address. The resulting physical addresses may be a permutation of the logical addresses.

Figure 4:
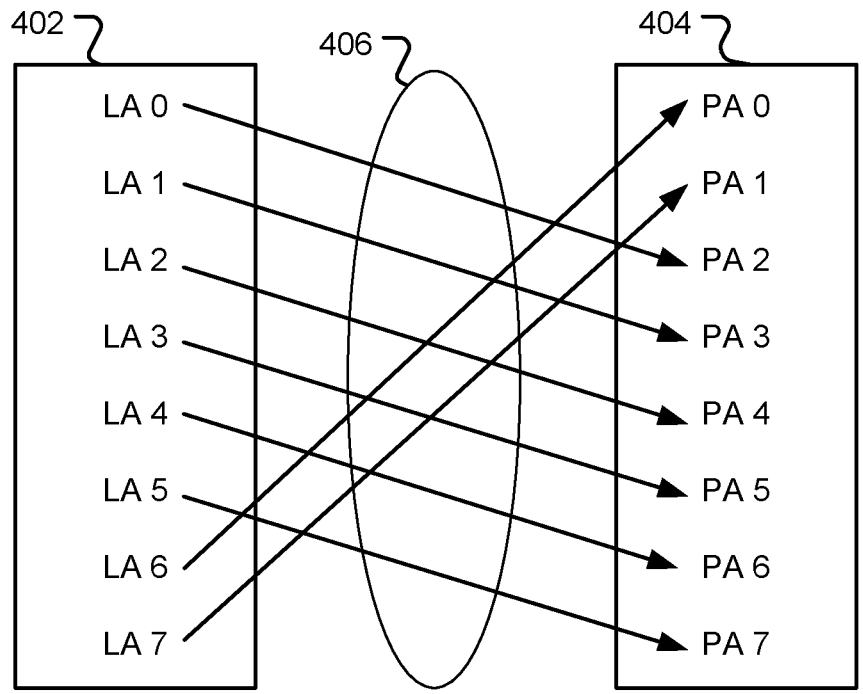
FIG. 4 is a diagrammatic representation of a mapping from a logical memory address to a physical memory address in accordance with some embodiments of the disclosure.

A first example of a mapping for a 3-bit address is shown in FIG. 4. FIG. 4 shows a logical address space 402 and a physical address space 404. The mapping is bijective, since each logical address (LA) is mapped to a single physical address (PA) and each PA is mapped to from a single LA. In this example, the mapping 406 is achieved by adding on offset of two to the logical address to obtain the physical address. Thus, for example LA 2 is mapped to PA 4. The addition is performed modulo 8 so, for example, LA 7 is mapped to PA 1, since $(7+2)_{modulo\ 8}=1$.

Figure 5:
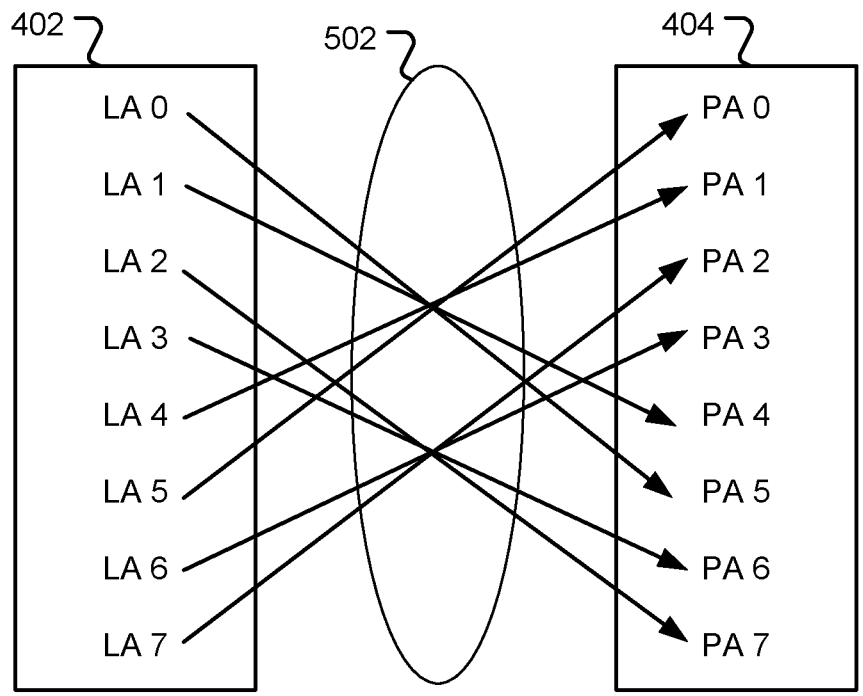
FIG. 5 is a diagrammatic representation of a further mapping from a logical memory address to a physical memory address in accordance with some embodiments of the disclosure.

A second example of a mapping for a 3-bit address is shown in FIG. 5. FIG. 5 again shows a logical address space 402 and a physical address space 404. Each logical address (LA) is mapped to a physical address (PA). In this example, the mapping 502 is achieved by scrambling the logical address. The scrambling is achieved by performing a bitwise XOR operation between the logical address and the scrambler value 5 (101 binary) to obtain the physical address. Thus LA addresses {0, 1, 2, 3, 4, 5, 6, 7} are mapped to physical addresses {5, 4, 7, 6, 1, 0, 3, 2}, respectively. The XOR operation flips the first and last bits of the logical address to obtain the physical address.

Figure 6:
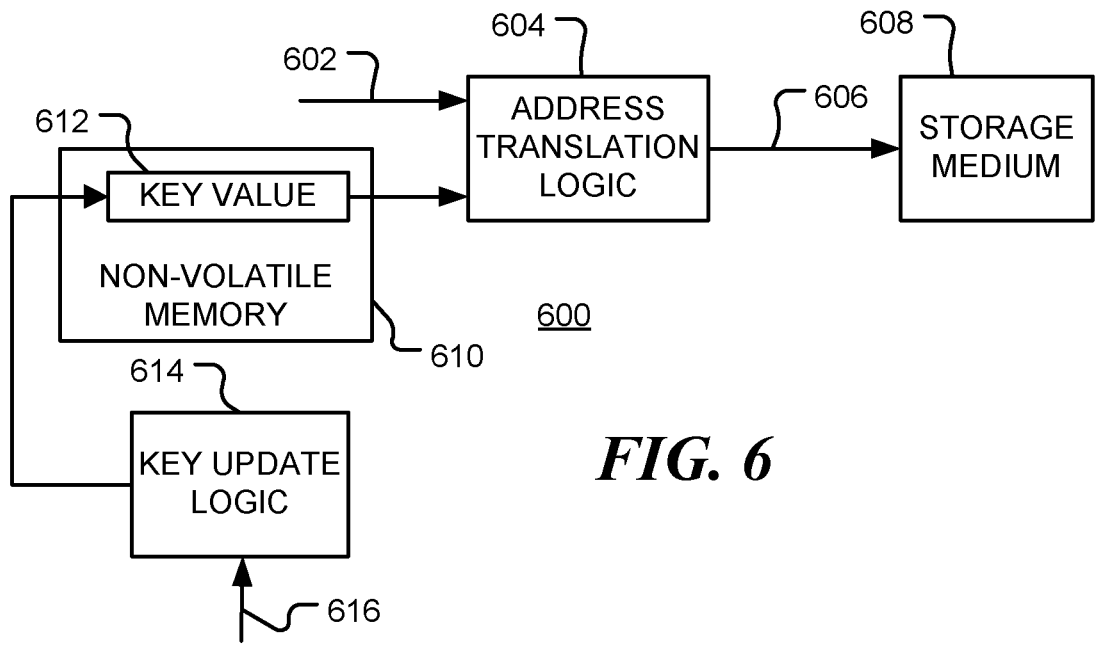
FIG. 6 is a block diagram of an apparatus for wear leveling of a storage medium in accordance with some embodiments of the disclosure.

FIG. 6 is a block diagram of an apparatus 600 for wear leveling of a memory or other storage medium. A request 602 to access a memory at given logical address is input to address translation logic 604. The address translation logic 604 maps the logical address to a physical address 606 that is used to access memory or other storage medium 608. In some embodiments, a first storage element 610 stores a key value 612 during an off-period of a power cycle. The address translation logic 604 is configured to map a logical address 602 to a physical address 606 in the memory 608 dependent upon the key value 612. Key update logic 614 is configured to update the key value 612 stored in the first storage element 610. The key value 612 is updated at a power cycle, such that the mapping from logical memory address to physical memory address is varied from one power cycle to another. Thus, the key update logic is responsive to a power cycle signal 616, such as a power-on reset, or power-off signal, for example.

The first storage element 610 may include a non-volatile memory, such as a CES memory.

Figure 7:
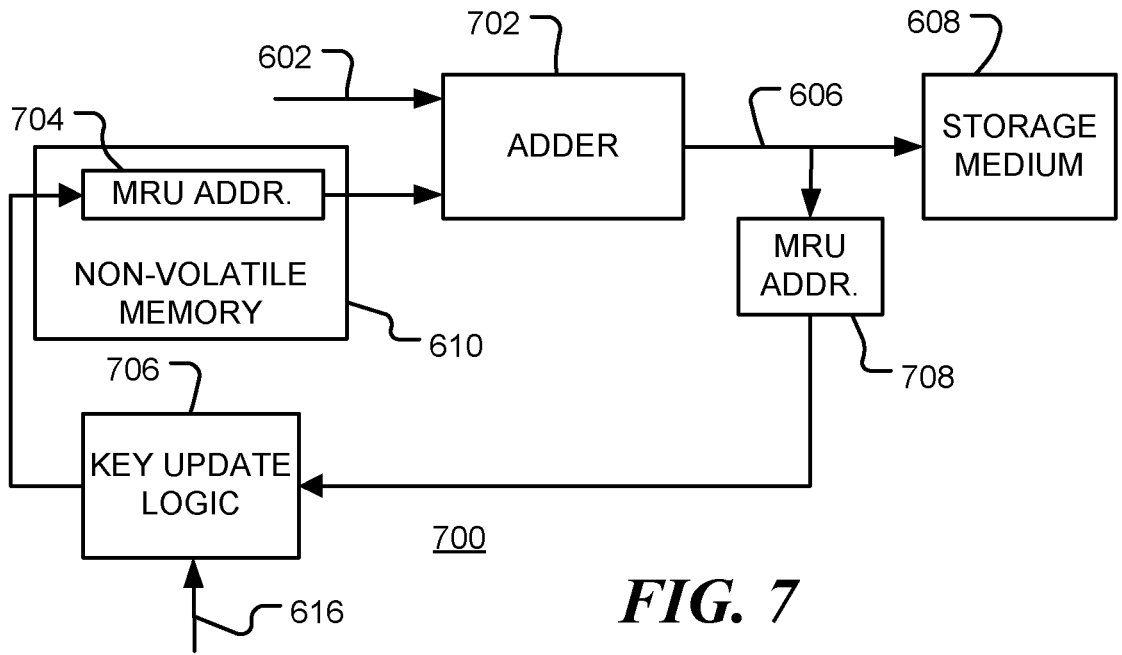
FIG. 7 is a block diagram of an apparatus for wear leveling of a storage medium in accordance with a further embodiment of the disclosure.

FIG. 7 is a block diagram of an embodiment of an apparatus 700 for which the key value is an address offset value. In this embodiment, the address translation logic 702 of the apparatus 700 comprises an adder having the logical address 602 and the address offset value 704 as inputs. The key update logic 706 is configured to store a most recently used (MRU) physical address 708 in the first storage element 610 during a power-down operation at the end of an on-period of a power cycle. The most recently accessed physical address 708 may be updated periodically or during the power-down operation.

Alternatively, the address offset value 704 may comprise one or more bits of a physical address accessed at the end of an on-period of a power cycle. For example, one or more most significant bits (MSBs) may be used.

Figure 8:
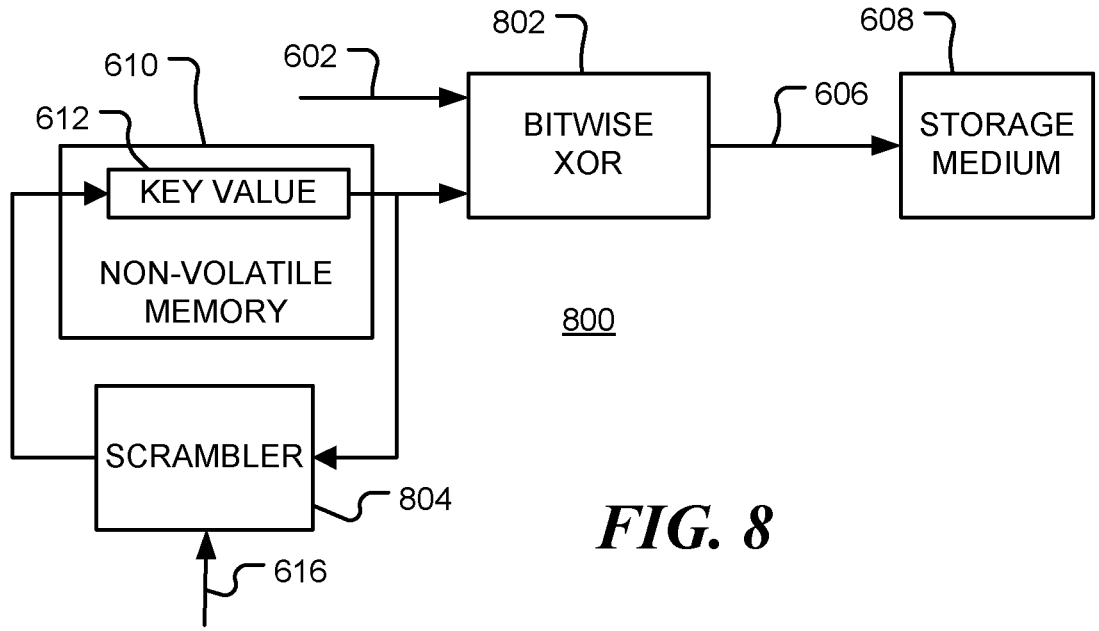
FIG. 8 is a block diagram of an apparatus for wear leveling of a storage medium in accordance with a still further embodiment of the disclosure.

FIG. 8 shows a further embodiment 800 of the apparatus. This apparatus 800 incorporates an address scrambler. Address translation logic 802 performs a bitwise XOR operation between the logical address 602 and the stored key value 612 to produce the physical address 606. The stored key value 612 may be a current state of scrambler 804. The scrambler includes the key update logic which generates a next state of the scrambler from a current state.

The key update logic may be, for example, a counter, a linear-feedback shift register (LFSR), a hash function, a cryptographic primitive, or a physical unclonable function (PUF). The address translation logic may be configured to perform bit-wise XOR or XNOR operation between the logical address 602 and the key value 612 to provide the physical address 606.

Figure 9:
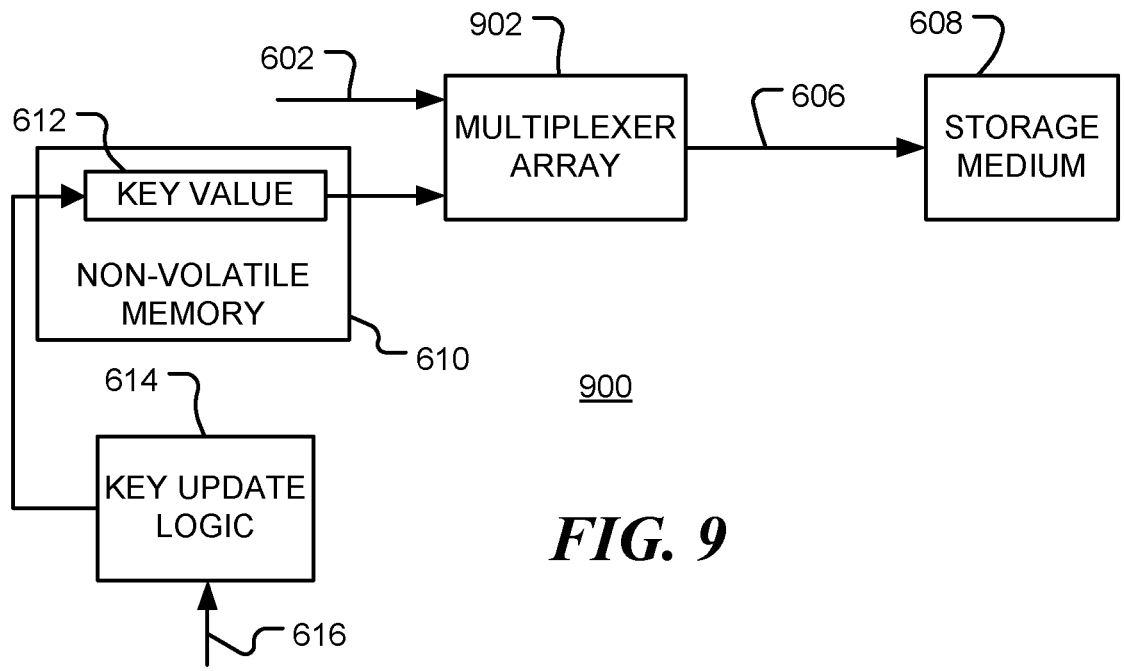
FIG. 9 is a block diagram of an apparatus for wear leveling of a storage medium in accordance with a still further embodiment of the disclosure.

FIG. 9 is a block diagram of a further embodiment 900 of the apparatus. In this embodiment, the address translation logic comprises a multiplexer array 902. Each multiplexer of the multiplexer array 902 receives the logical address 602 as input and selects one bit of the logical address to be output as one bit of the physical address 606. Selection of the one bit of the logical address to be output is dependent upon the stored key value 612. The multiplexer array 902 may be configured to produce a bijective mapping between the logical address 602 and the physical address 606. In this embodiment, the address translation logic 902 is configured to scramble or reorder the bit locations of logical address 602 to produce the physical address 606.

The key value 612 may be updated during power-up, sleep or power-down operations, for example.

In any of the embodiments described above, the first storage element, the address translation logic and the key update logic may be embedded in an integrated circuit or implemented in separate circuits.

Figure 10:
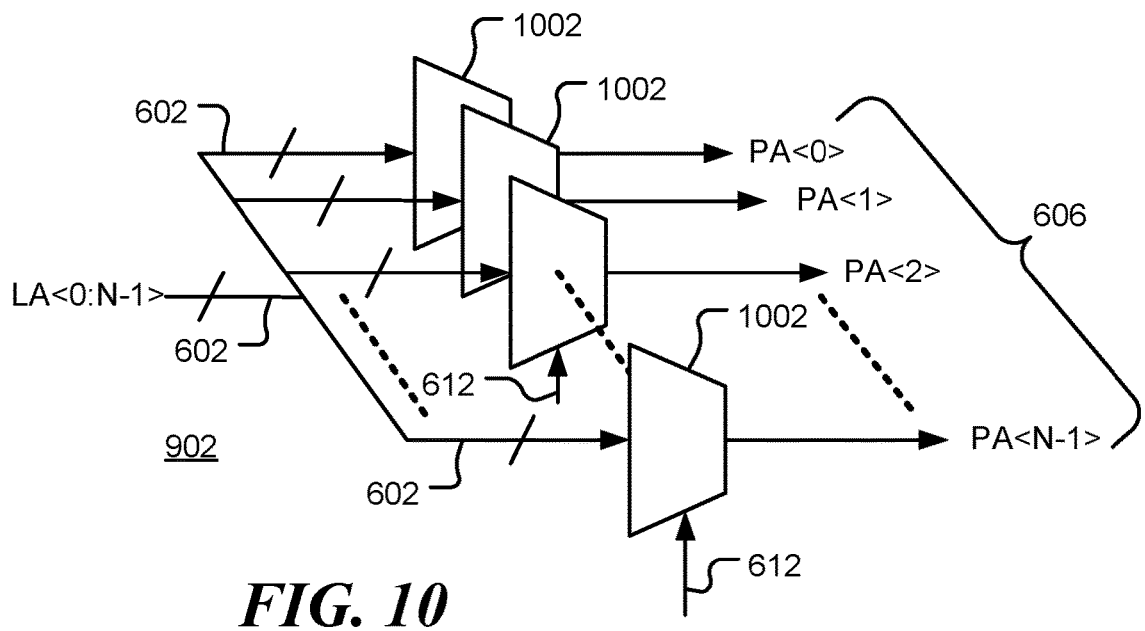
FIG. 10 is a diagrammatic representation of a multiplexer array in accordance with embodiments of the disclosure.

FIG. 10 is a diagrammatic representation of a multiplexer array 902 in accordance with embodiments of the disclosure. Multiplexer array 902 comprises a number, N, of multiplexers 1002, where N is number of address bits being reordered. Each multiplexer 1002 receives logical address 602 (or a subset of the bits of the logical address, such as a number of most significant bits). Each multiplexer is controlled by the key value 612 to select one bit of the logical address LA as output. The selected bit provides one bit of the physical address 606. In the figure, LA<0:N−1> denotes the N bits of the logical address to be reordered and PA<n> denotes the $n^{th}$ bit of the physical address.

Figure 11:
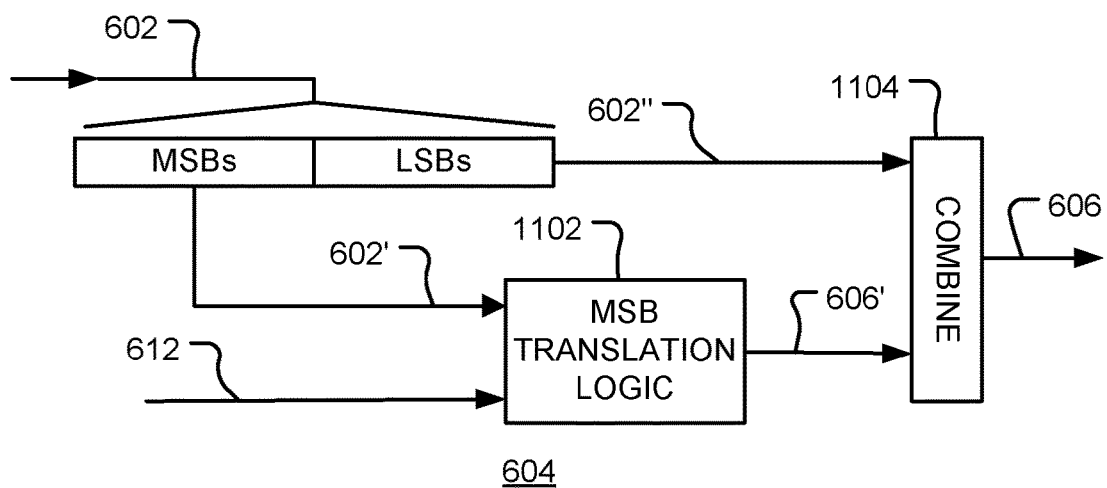
FIG. 11 is a block diagram of address translation logic in accordance with certain embodiments of the disclosure.

FIG. 11 is a block diagram of address translation logic 604 in accordance with certain embodiments of the disclosure. Logical memory address 602 contains a number of most significant bits (MSB's) 602' and a number of least significant bits (LSB's) 602". The MSB's are passed to MSB translation logic 1102 that is configured to map the MSB's 602' of the logical address to the MSB's 606' of the physical address, dependent upon the key value 612. The MSB's 606' of the physical address are combined with the LSB's 602″ of the logical address in combiner 1104 to provide physical memory address 606. As discussed above, MSB translation logic 1102 may be configured to perform a bijective mapping. The mapping may be achieved via various means such as a look-up table, a multiplexer array, relocation of bits, scrambling, adding an offset, etc., or a combination thereof. Mapping only the MSB's, or only a subset of the bits, rather than the full address reduces the complexity of the translation logic.

Other mappings may be used without departing from the present disclosure.

The key value may be stored in a non-volatile memory such as a CES storage element Further the protected memory cells may be CES storage elements configured to form a correlated electron random access memory (CeRAM). CeRAM utilizes an array of correlated electron switches.

In this context, a CES may exhibit an abrupt transition from conductive/low capacitance state to an insulative/high capacitive state, the transition arising from electron correlations rather than solid state structural phase changes (e.g., crystalline/amorphous in phase change memory (PCM) devices or filamentary formation and conduction in resistive RAM devices as discussed above). In one aspect, an abrupt conductor/insulator transition in a CES may be responsive to a quantum mechanical phenomenon, in contrast to melting/solidification or filament formation. Such a quantum mechanical transition between conductive and insulative states in a CES memory device may be understood in any one of several aspects.

The transition from high resistance/capacitance to low resistance/capacitance can be represented by a singular impedance of the device. A variable impeder device may comprise characteristics of both variable impedance and variable capacitance. For example, an equivalent circuit for a variable impeder device may, in an embodiment, comprise a variable resistor in parallel with a variable capacitor. Of course, a variable impeder device may comprise a substantially homogenous CEM, where the CEM comprises characteristics of variable capacitance and variable resistance.

In particular implementations of this disclosure, a storage element may comprise: a variable impedance memory cell including a CES; a write circuit for placing the variable impedance memory cell in a first impedance state or a second impedance state depending on signals provided to the memory device, where an impedance of a CES is higher in the second impedance state than in the first impedance state; and a read circuit for sensing the state of the memory cell and providing an electrical signal corresponding to the sensed state of the memory cell. In one aspect, a resistive component of impedance of a CES in the second memory cell state may be more than 100 times the resistive component of the impedance in the second memory cell state.

In a particular embodiment, CES storage elements may be combined as a correlated random access memory (CeRAM). In this context, a CES device comprises a material that may transition between or among a plurality of predetermined detectable memory states based, at least in part, on a transition of at least a portion of the material between a conductive state and an insulative state. In this context, a "memory state" means a detectable state of a memory device that is indicative of a value, symbol, parameter or condition, just to provide a few examples. A memory state of a storage element may be detected based, at least in part, on a signal detected on terminals of the storage element in a read operation. Further, a storage element may be placed in a particular memory state to represent or store a particular value, symbol or parameter by application of one or more signals across terminals of the element in a "write operation".

Some embodiments may be used to read a data value which is stored in a CES device. Data may be written to the CES device using a variety of methods, examples of which are described in co-owned U.S. patent application Ser. No. 14/826,064 Programmable Voltage For Correlated Electron Switch and/or co-owned U.S. patent application Ser. No. 14/826,091 Programmable Current For Correlated Electron Switch which are incorporated herein by reference. For example, data may be written by controlling the voltage and/or current across the CES device.

As discussed above, correlated electron material (CEM) may be used to form a correlated electron switch (CES), which in turn may be used to form a memory cell and/or logic device. In this context, a CES may exhibit a substantially abrupt high/low impedance transition arising from electron correlations rather than solid state structural phase changes (e.g., crystalline/amorphous in phase change memory (PCM) devices or filamentary formation and conduction in resistive RAM devices). In one aspect, a substantially abrupt conductor/insulator transition in a CES may be responsive to a quantum mechanical phenomenon, in contrast to melting/solidification or filament formation, for example. Such a quantum mechanical transition between conductive and insulative states, and/or between first and second impedance states, in a CES may be understood in any one of several aspects. As used herein, the terms "conductive state", "lower impedance state", and/or "metal state" may be interchangeable, and/or may at times be referred to as a "conductive/lower impedance state." Similarly, the terms "insulative state" and "higher impedance state" may be used interchangeably herein, and/or may at times be referred to as an "insulative/higher impedance state."

In an aspect, a quantum mechanical transition of correlated electron switch material between an insulative/higher impedance state and a conductive/lower impedance state may be understood in terms of a Mott transition. In a Mott transition, a material may switch from an insulative/higher impedance state to a conductive/lower impedance state if a Mott transition condition occurs. The Mott criteria is defined by $(n_C)^{1/3}a \approx 0.26$, where $n_C$ is a concentration of electrons and "a" is the Bohr radius. When a critical carrier concentration is achieved such that the Mott criteria is met, the Mott transition will occur and the state of the CES will change from a higher resistance/higher capacitance state (that is, an insulative/higher impedance state) to a lower resistance/lower capacitance state (that is, a conductive/lower impedance state).

In another aspect, the Mott transition is controlled by a localization of electrons. When carriers are localized, the strong coulomb interaction between the electrons splits the bands of the CEM to create an insulator. When electrons are no longer localized, the weak coulomb interaction dominates and the band splitting is removed, resulting in a metal (conductive) band. This is sometimes explained as a "crowded elevator" phenomenon. While an elevator has only a few people in it, the people can move around easily, which is analogous to a conductive/lower impedance state. While the elevator reaches a certain concentration of people, on the other hand, the people can no longer move, which is analogous to the insulative/higher impedance state. However, it should be understood that this classical explanation provided for illustrative purposes, like all classical explanations of quantum phenomenon, is only an incomplete analogy, and that claimed subject matter is not limited in this respect.

Further, switching from an insulative/higher impedance state to a conductive/lower impedance state may bring about a change in capacitance in addition to a change in resistance. For example, a CES may include the property of variable resistance together with the property of variable capacitance. That is, impedance characteristics of a CES device may include both resistive and capacitive components. For example, in a metal state, a CEM may have substantially zero electric field, and therefore substantially zero capacitance. Similarly, in an insulative/higher impedance state (in which electron screening may be very imperfect due to lower density of free electrons), an external electric field may be capable of penetrating the CEM and therefore the CEM will have capacitance due to a physical change in the dielectric function of the CEM. Thus, for example, a transition from an insulative/higher impedance state to a conductive/lower impedance state in a CES may result in changes in both resistance and capacitance.

A CES device may switch impedance states responsive to a Mott-transition in a majority of the volume of the CEM of a CES device. In an embodiment, a CES device may comprise a "bulk switch." As used herein, the term "bulk switch" refers to at least a majority volume of a CEM of a CES device switching impedance states, such as responsive to a Mott-transition. For example, in an embodiment, substantially all of a CEM of a CES device may switch from an insulative/higher impedance state to a conductive/lower impedance state or from a conductive/lower impedance state to an insulative/higher impedance state responsive to a Mott-transition. A CEM may comprise one or more transition metal oxides, one or more rare earth oxides, one or more oxides of one or more f-block elements of the periodic table, one or more rare earth transitional metal oxide perovskites, yttrium, and/or ytterbium, although claimed subject matter is not limited in scope in this respect. In an embodiment, a device, such as CES device, may comprise CEM including one or more materials selected from a group comprising aluminum, cadmium, chromium, cobalt, copper, gold, iron, manganese, mercury, molybdenum, nickel, palladium, rhenium, ruthenium, silver, tin, titanium, vanadium, and zinc (which may be linked to a cation such as oxygen or other types of ligands), or combinations thereof, although claimed subject matter is not limited in scope in this respect.

A CES device may comprise CEM sandwiched between conductive terminals to form a variable impeder device. As utilized herein, the terms "correlated electron switch" and "variable impeder" may be interchangeable. At least in part through application of a critical voltage and a critical current between the terminals, the CEM may transition between the aforementioned conductive/lower impedance state and insulative/higher impedance state. As mentioned, CEM in a variable impeder device may transition between a first impedance state and a second impedance state due to a quantum mechanical transition of the correlated electron switch material as a result an applied critical voltage and an applied critical current, as described in more detail below. Also, as mentioned above, a variable impeder device may exhibit properties of both variable resistance and variable capacitance.

In a particular embodiment, a variable impeder device, such as a CES device, may comprise a CEM that may transition between or among a plurality of detectable impedance states based, at least in part, on a transition of at least a majority portion of the CEM between an insulative/higher impedance state and a conductive/lower impedance state due to a quantum mechanical transition of the correlated electron switch material. For example, in an embodiment, a CES device may comprise a bulk switch, in that substantially all of a CEM of a CES device may switch from an insulative/higher impedance state to a conductive/lower impedance state or from a conductive/lower impedance state to an insulative/higher impedance state responsive to a Mott-transition. In this context, an "impedance state" means a detectable state of a variable impeder device that is indicative of a value, symbol, parameter and/or condition, just to provide a few examples. An impedance state of a CES device may be detected based, at least in part, on a signal detected on terminals of the CES device in a read and/or sense operation. In another particular embodiment, a CES device may be placed in a particular impedance state to represent or store a particular value, symbol, and/or parameter, and/or to achieve a particular capacitance value for the CES device by application of one or more signals across terminals of the CES device in a "write" and/or "program" operation, for example. Of course, claimed subject matter is not limited in scope to the particular example embodiments described herein.

An example CES/variable impeder device may comprise characteristics of both variable resistance and variable capacitance. While a variable impeder device may comprise a substantially homogenous CEM an equivalent circuit for a variable impeder device may comprise a variable resistor in parallel with a variable capacitor.

Table 1 below depicts an example truth table for an example variable impeder device, such as a CES device.

TABLE 1

Correlated Electron Switch Truth Table

| Resistance | Capacitance | Impedance |
|---|---|---|
| $R_{high}(V_{applied})$ | $C_{high}(V_{applied})$ | $Z_{high}(V_{applied})$ |
| $R_{low}(V_{applied})$ | $C_{low}(V_{applied})$~0 | $Z_{low}(V_{applied})$ |

A resistance of a variable impeder device may transition between a lower resistance state and a higher resistance state that is a function, at least in part, of a voltage $V_{applied}$ applied across the CEM. A resistance of a lower resistance state may be 10-100,000 times lower than a resistance of a higher resistance state, although claimed subject matter is not limited in scope in this respect. Similarly, a capacitance of a variable impeder device may transition between a lower capacitance state, which for an example embodiment may comprise approximately zero, or very little, capacitance, and a higher capacitance state that is a function, at least in part, of a voltage applied across the CEM. Also, as seen in Table 1, a variable impeder device transition from a higher resistance/higher capacitance state to a lower resistance/lower capacitance state may be represented as a transition from a higher impedance state to a lower impedance state. Similarly, a transition from a lower resistance/lower capacitance state to a higher resistance/higher capacitance state may be represented as a transition from a lower impedance state to a higher impedance state.

Figure 12:
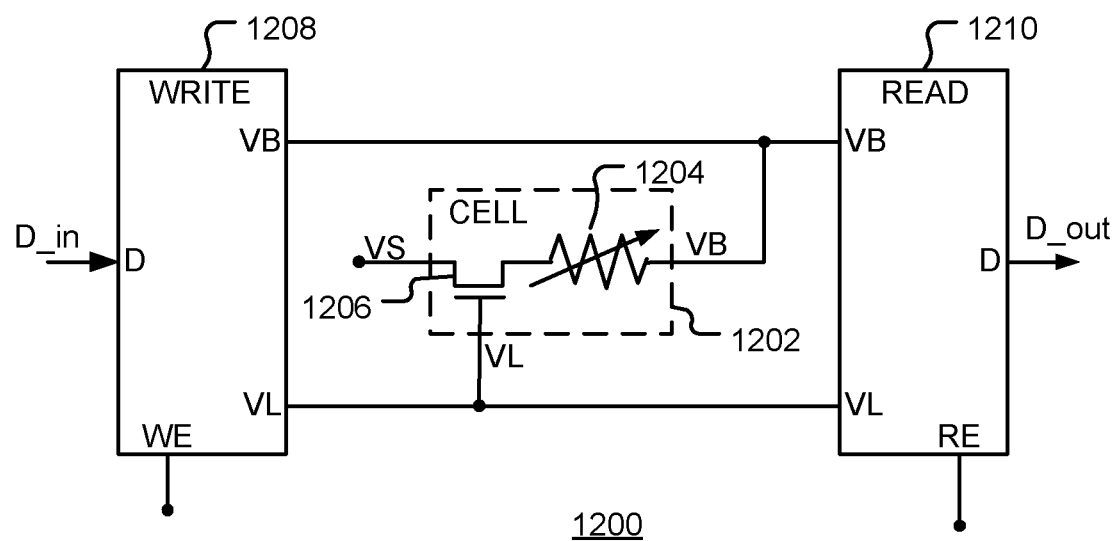
FIG. 12 is a simplified block diagram of a correlated electron switch (CES) storage element in accordance with certain embodiments of the disclosure.

FIG. 12 is a simplified block diagram of a programmable correlated electron switch (CES) device 1200. The CES device comprises variable impedance memory cell 1202 containing CES element 1204 (here shown as a variable impeder, i.e. a devices having variable resistance and variable capacitance) and transistor 1206. Voltage supplied to terminal VL is coupled to the gate of transistor 1206 and limits current flow between ground terminal VS and bias terminal VB when a bias voltage is supplied at terminal VB. Write circuit 1208 is used to place the variable impedance memory cell 1202 in a first impedance state or a second impedance state depending on signal D_in provided to the memory device at terminal D of the write circuit. The impedance of a CES is higher in the second impedance state than in the first impedance state. The VB terminal of write circuit 1208 provides a voltage across the CES, while the VL terminal of write circuit 1208 provides a voltage to control current flow through the CES. These voltages ae controlled dependent upon the D_in signal supplied at terminal D. The write circuit may be enabled or disabled by a signal supplied to write-enable (WE) terminal of write circuit 1208. Read circuit 1210 is used to sense the state of the memory cell and provide an electrical signal at terminal D_out corresponding to the sensed state of the memory cell 1202. Terminal VL of read circuit 1210 provides a voltage to open the gate of transistor 1206, while terminal VB of read circuit 1210 provides a voltage that causes a current to flow through CES 1204. The current flow is sensed in read circuit 1210 and used to select the value of the D_out signal provide a terminal D of read circuit 1210.

It will be apparent to those of ordinary skill in the art that other non-volatile memories may be used to store the key value when the apparatus is powered down or put into a sleep mode.

Although illustrative embodiments have been described in detail herein with reference to the accompanying drawings, it is to be understood that the invention is not limited to those precise embodiments, and that various changes and modifications can be effected therein by one skilled in the art without departing from the scope or essence of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing X includes any suitable method for causing another party such as a remote user, a remote processing resource (e.g., a server or cloud computer) or a machine to perform X. Similarly, performing elements X, Y, and Z may include any method of directing or controlling any combination of such other individuals or resources to perform elements X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. An apparatus for wear-leveling of a storage medium, where the apparatus is supplied with electrical power during on-periods of a plurality of power cycles and comprises:
    a storage element that stores a key value during an off-period or a sleep-period of a power cycle of the plurality of power cycles;
    address translation logic configured to map a logical address to a physical address in the storage medium, where the mapping is dependent upon the key value; and
    key update logic configured to update the key value stored in the storage element;
   where the key value is updated at one or more power cycles of the plurality of power cycles and the mapping from the logical address to the physical address is varied from one power cycle to another of the one or more power cycles.

2. The apparatus of item 1, where the storage element comprises a non-volatile memory.

3. The apparatus of item 2, where the storage element comprises a correlated electron switch (CES) storage element.

4. The apparatus of item 1, where:
    the key value comprises an address offset value;
    the address translation logic comprises an adder having the logical address and the address offset value as inputs; and
    the key update logic is configured to store a most recently accessed physical address in the storage element at the end of an on-period of a power cycle.

5. The apparatus of item 1, where:
    the key value comprises an address offset value;
    the address translation logic comprises an adder having the logical address and the address offset value as inputs; and
    the address offset value comprises one or more bits of a physical address accessed during an on-period of a power cycle.

6. The apparatus of item 1, where:
the address translation logic comprises an address scrambler;
the key value comprises a state of the scrambler; and
the key update logic is configured to generate a next state of the scrambler from a current state.

7. The apparatus of item 6, where the address scrambler is selected from a group of scramblers consisting of:
a counter;
a linear-feedback shift register (LFSR);
a hash function;
a cryptographic primitive; and
a physical unclonable function.

8. The apparatus of item 1, where the address translation logic is configured to perform bit-wise XOR or XNOR operation between the logical address and the key value to provide the physical address.

9. The apparatus of item 1, where:
the address translation logic comprises a multiplexer array;
each multiplexer of the multiplexer array receives the logical address as input, selects one bit of the logical address and outputs the selected bit as one bit of the physical address; and
selection of the one bit of the logical address to be output is dependent upon the key value.

10. The apparatus of item 9, where the multiplexer array is configured to produce a bijective mapping between the logical address and the physical address.

11. The apparatus of item 1, where the address translation logic is configured to scramble the bit locations of logical address to produce the physical address.

12. The apparatus of item 1, where the key value is updated responsive to power-on, power-off or sleep operations.

13. The apparatus of item 1, further comprising the storage medium, where the storage medium comprises a volatile memory.

14. The apparatus of item 1, where the storage element, the address translation logic and the key update logic are embedded in a single integrated circuit.

15. A method of controlling usage of a storage medium of an electrically powered device, the method comprising:
receiving a logical memory address;
mapping the logical memory address to a physical memory address in the storage medium, where the mapping is dependent upon a key value;
accessing the storage medium at the physical memory address; and
updating the key value at one or more power cycles of the electrically powered device.

16. The method of item 15, where mapping the logical memory address to the physical memory address comprises rearranging bits of the logical memory address, flipping bits of the logical memory address, or a combination thereof.

17. The method of item 15, further comprising storing the updated key value in a non-volatile memory.

18. The method of item 17, where storing the updated key value in the non-volatile memory comprises storing the updated key value in a correlated electron switch (CES) storage element.

19. The method of item 17, where the key value comprises an address offset value and further comprising:
mapping the logical memory address to the physical memory address comprises adding the logical memory address and the address offset value; and
updating the key value at one or more power cycles of the electrically powered device comprises storing a most recently accessed physical memory address in the non-volatile memory at the end of an on-period of a power cycle.

20. The method of item 17, where the key value comprises an address offset value and further comprising:
mapping the logical memory address to the physical memory address comprises adding the logical address and the address offset values; and
updating the key value stored in the non-volatile memory at one or more power cycles of the electrically powered device comprises storing one or more bits of a physical memory address accessed before a power-down or a sleep operation.

21. The method of item 17, where the key value comprises a state of the scrambler and further comprising:
mapping the logical memory address to the physical memory address comprises scrambling the logical memory address in a scrambler; and
updating the key value stored in the non-volatile memory at each power cycle comprises generating a next state of the scrambler from a current state.

22. The method of item 21, where the scrambler is selected from a group of scramblers consisting of:
a counter;
a linear-feedback shift register (LFSR);
a hash function;
a cryptographic primitive; and
a physical unclonable function.

23. The method of item 15, where mapping the logical memory address to the physical memory address comprises:
for each multiplexer of a multiplexer array:
inputting the logical memory address to the multiplexer;
controlling the multiplexer dependent upon the key value to select one bit of the logical memory address;
outputting the selected one-bit of the logical memory address as one bit of the physical memory address,
where the multiplexer array is configured to produce a bijective mapping between the logical memory address and the physical memory address.

24. The method of item 15, where the key value is updated responsive to a power-down, a sleep operation or a power-up operation.

What is claimed is:
1. An apparatus for wear-leveling of a storage medium of an electrically powered device, wherein the apparatus is supplied with electrical power during on-periods of a plurality of power cycles and comprises:
a storage element that stores a key value during an off-period or a sleep-period of a power cycle of the plurality of power cycles;
address translation logic circuitry configured to map a logical address to a physical address in the storage medium of the electrically powered device, wherein the mapping is obtained by manipulating bits of the logical address dependent upon the key value, and wherein the key value is the same for a plurality of logical addresses in an address space; and
key update logic circuitry configured to update the key value stored in the storage element;
wherein the key value is updated, by the key update logic circuitry, during a power-up, sleep or power-off operation of one or more power cycles of the plurality of power cycles, the mapping of the logical address is varied from one power cycle to another of the one or more power cycles, the logical address being mapped to a first physical address prior to a first power cycle of the one or more power cycles, and the logical address being mapped to a second physical address, different from the first physical address, after the first power cycle, to distribute memory accesses across the storage medium of the electrically powered device and reduce failure of memory cells of the storage medium of the electrically powered device, and wherein the storage element, address translation logic circuitry and key update logic circuitry are implemented in hardware.

2. The apparatus of claim 1, where the storage element comprises a non-volatile memory.

3. The apparatus of claim 2, where the storage element comprises a correlated electron switch (CES) storage element.

4. The apparatus of claim 1, where:
the key value comprises an address offset value;
the address translation logic circuitry comprises an adder having the logical address and the address offset value as inputs; and
the key update logic circuitry is configured to store a most recently accessed physical address in the storage element at the end of an on-period of a power cycle.

5. The apparatus of claim 1, where:
the key value comprises an address offset value;
the address translation logic circuitry comprises an adder having the logical address and the address offset value as inputs; and
the address offset value comprises one or more bits of a physical address accessed during an on-period of a power cycle.

6. The apparatus of claim 1, where:
the address translation logic circuitry comprises an address scrambler;
the key value comprises a state of the scrambler; and
the key update logic circuitry is configured to generate a next state of the scrambler from a current state.

7. The apparatus of claim 6, where the address scrambler is selected from a group of scramblers consisting of:
a counter;
a linear-feedback shift register (LFSR);
a hash function;
a cryptographic primitive; and
a physical unclonable function.

8. The apparatus of claim 1, where the address translation logic circuitry is configured to perform bit-wise XOR or XNOR operation between the logical address and the key value to provide the physical address.

9. The apparatus of claim 1, where:
the address translation logic circuitry comprises a multiplexer array;
each multiplexer of the multiplexer array receives the logical address as input, selects one bit of the logical address and outputs the selected bit as one bit of the physical address; and
selection of the one bit of the logical address to be output is dependent upon the key value.

10. The apparatus of claim 9, where the multiplexer array is configured to produce a bijective mapping between the logical address and the physical address.

11. The apparatus of claim 1, where the address translation logic circuitry is configured to scramble bit locations of the logical address to produce the physical address.

12. The apparatus of claim 1, where the key value is updated responsive to power-on, power-off or sleep operations.

13. The apparatus of claim 1, further comprising the storage medium, where the storage medium comprises a volatile memory.

14. The apparatus of claim 1, where the storage element, the address translation logic circuitry and the key update logic circuitry are embedded in a single integrated circuit.

15. A method of controlling usage of a storage medium of an electrically powered device, the method comprising:
receiving, by address translation logic circuitry of the electrically powered device, a logical memory address;
mapping, by the address translation logic circuitry, the logical memory address to a physical memory address in the storage medium, wherein the mapping is obtained by manipulating the logical memory address dependent upon a key value;
accessing, by the electrically powered device, the storage medium at the physical memory address; and
updating, by key update logic circuitry of the electrically powered device, the key value during a power-up, sleep or power-off operation of one or more power cycles of the electrically powered device,
wherein the mapping of the logical memory address is varied from one power cycle to another of the one or more power cycles,
the logical memory address being mapped to a first physical memory address prior to a first power cycle of the one or more power cycles, and
the logical memory address being mapped to a second physical memory address, different from the first physical memory address, after the first power cycle, to distribute memory accesses across the storage medium and reduce failure of memory cells of the storage medium.

16. The method of claim 15, where mapping the logical memory address to the physical memory address comprises rearranging bits of the logical memory address, flipping bits of the logical memory address, or a combination thereof.

17. The method of claim 15, further comprising storing the updated key value in a non-volatile memory.

18. The method of claim 17, where storing the updated key value in the non-volatile memory comprises storing the updated key value in a correlated electron random access memory (CeRAM).

19. The method of claim 17, where the key value comprises an address offset value,
where said mapping the logical memory address to the physical memory address comprises adding, by the address translation logic circuitry, the logical memory address and the address offset value, and
where said updating the key value during the power-down operation comprises storing, by the key update logic circuitry, a most recently accessed physical memory address in the non-volatile memory at the end of an on-period of a power cycle.

20. The method of claim 17, where the key value comprises an address offset value,
where said mapping the logical memory address to the physical memory address comprises adding, by the address translation logic circuitry, the logical address and the address offset values, and where said updating the key value during the power-down operation comprises storing, by the key update logic circuitry, one or more bits of a physical memory address accessed before a power-down or a sleep operation.

21. The method of claim 17, where the key value comprises a state of the scrambler,
where said mapping the logical memory address to the physical memory address comprises scrambling, by the address translation logic circuitry, the logical memory address in a scrambler, and
where said updating the key value stored in the non-volatile memory comprises generating, by the key update logic circuitry, a next state of the scrambler from a current state.

22. The method of claim 21, where the scrambler is selected from a group of scramblers consisting of:
a counter;
a linear-feedback shift register (LFSR);
a hash function;
a cryptographic primitive; and
a physical unclonable function.

23. The method of claim 15, where mapping the logical memory address to the physical memory address comprises:
for each multiplexer of a multiplexer array:
inputting the logical memory address to the multiplexer;
controlling the multiplexer dependent upon the key value to select one bit of the logical memory address; and
outputting the selected one-bit of the logical memory address as one bit of the physical memory address,
where the multiplexer array is configured to produce a bijective mapping between the logical memory address and the physical memory address.

24. The method of claim 15, where the key value is updated responsive to a power-down, a sleep operation or a power-up operation.

* * * * *

UNITED STATES PATENT AND TRADEMARK OFFICE
CERTIFICATE OF CORRECTION

PATENT NO. : 10,761,976 B2  
APPLICATION NO. : 15/361804  
DATED : September 1, 2020  
INVENTOR(S) : Mudit Bhargava, Joel Thornton Irby and Vikas Chandra Page 1 of 1

It is certified that error appears in the above-identified patent and that said Letters Patent is hereby corrected as shown below:

In the Claims

Column 16, Line 58 Claim 1, should read 'mapping is obtained by manipulating the logical'

Signed and Sealed this  
First Day of December, 2020

Andrei Iancu  
*Director of the United States Patent and Trademark Office*